United States Patent
Ljung et al.

(10) Patent No.: US 8,984,652 B2
(45) Date of Patent: Mar. 17, 2015

(54) TRANSFER OF DIGITAL RIGHTS MANAGEMENT INFORMATION

(75) Inventors: Peter Ljung, Malmö (SE); Stefan Andersson, Klågerup (SE)

(73) Assignees: Sony Corporation, Tokyo (JP); Sony Mobile Comunications AB, Lund (SE)

( * ) Notice: Subject to any disclaimer, the term of this patent is extended or adjusted under 35 U.S.C. 154(b) by 1929 days.

(21) Appl. No.: 11/668,117

(22) Filed: Jan. 29, 2007

(65) Prior Publication Data

US 2008/0027868 A1    Jan. 31, 2008

Related U.S. Application Data

(60) Provisional application No. 60/820,668, filed on Jul. 28, 2006.

(51) Int. Cl.
| | | |
|---|---|---|
| G06F 7/04 | (2006.01) | |
| H04L 29/06 | (2006.01) | |
| H04L 9/32 | (2006.01) | |
| H04N 7/167 | (2011.01) | |
| G06F 21/00 | (2013.01) | |
| G06F 21/10 | (2013.01) | |

(52) U.S. Cl.
CPC ........ *G06F 21/10* (2013.01); *G06F 2221/0764* (2013.01); *G06F 2221/0782* (2013.01)
USPC ............... 726/27; 726/30; 713/165; 713/168; 380/201; 380/203; 380/231; 380/232; 705/51; 705/57

(58) Field of Classification Search
USPC ............... 726/27, 30; 713/165, 168; 380/201, 380/203, 231, 232; 705/51, 57
See application file for complete search history.

(56) References Cited

U.S. PATENT DOCUMENTS

| | | | |
|---|---|---|---|
| 2002/0004910 A1 | 1/2002 | Penzias et al. | |
| 2002/0013772 A1 | 1/2002 | Peinado | |
| 2003/0163724 A1* | 8/2003 | Tayebi et al. | 713/200 |
| 2004/0088176 A1* | 5/2004 | Rajamani | 705/1 |
| 2005/0132347 A1* | 6/2005 | Harper et al. | 717/168 |

(Continued)

FOREIGN PATENT DOCUMENTS

| | | |
|---|---|---|
| EP | 1 622 060 A1 | 2/2006 |
| WO | WO 93/01550 | 1/1993 |

(Continued)

OTHER PUBLICATIONS

Annex to Form PCT/ISA/206, "Invitation to Pay Additional Fees with Annex entitled, Communication Relating to the Results of the Partial International Search" for related PCT Application No. PCT/IB2007/050457, mailed Jun. 20, 2007 (5 pages).

(Continued)

*Primary Examiner* — Aravind Moorthy
(74) *Attorney, Agent, or Firm* — Snyder, Clark, Lesch & Chung, LLP

(57) ABSTRACT

A device including a communication interface and processing logic is provided. The communication interface may receive digital rights management security information and content from a source device, the digital rights management information having been deactivated in the source device. The processing logic may reactivate the digital rights management security information and may render the content according to the digital rights management security information.

21 Claims, 15 Drawing Sheets

(56) References Cited

U.S. PATENT DOCUMENTS

| | | | |
|---|---|---|---|
| 2005/0204405 A1* | 9/2005 | Wormington et al. | 726/27 |
| 2005/0251489 A1 | 11/2005 | Coley et al. | |
| 2006/0048237 A1* | 3/2006 | Luo et al. | 726/32 |
| 2006/0130153 A1* | 6/2006 | Hagg et al. | 726/29 |
| 2006/0248596 A1* | 11/2006 | Jain et al. | 726/27 |
| 2007/0098156 A1* | 5/2007 | Blythe | 380/37 |

FOREIGN PATENT DOCUMENTS

| | | |
|---|---|---|
| WO | WO 2005/091163 A1 | 9/2005 |
| WO | WO 2005/104426 A2 | 11/2005 |

OTHER PUBLICATIONS

Written Opinion and International Search Report for PCT Application No. PCT/IB2007/050457, mailed Sep. 26, 2007 (16 pages).

International Preliminary Report on Patentability issued in corresponding international application No. PCT/IB2007/050457, mailed Dec. 19, 2008, 10 pages.

"DRM Architecture," Open Mobile Alliance, Approved Version 2.0, pp. 1-24, Mar. 3, 2006.

"DRM Content Format," Open Mobile Alliance, Approved Version 1.0, pp. 1-14, Jun. 15, 2004.

"Digital Rights Management," Open Mobile Alliance, Approved Version 1.0, pp. 1-20, Jun. 15, 2004.

"Enabler Release Definition for DRM V2.0," Open Mobile Alliance, Approved Version 2.0, pp. 1-14, Mar. 3, 2006.

"DRM Content Format," Open Mobile Alliance, Approved Version 2.0, pp. 1-35, Mar. 3, 2006.

"DRM Rights Expression Language" Open Mobile Alliance, Approved Version 2.0, pp. 1-53, Mar. 3, 2006.

"Download Architecture," Open Mobile Alliance, Approved Version 1.0, pp. 1-21, Jun. 25, 2004.

"Rights Expression Language," Open Mobile Alliance, Approved Version 1.0, pp. 1-29, Jun. 15, 2004.

"Enabler Release Definition for DRM," Open Mobile Alliance, Approved Version 1.0, pp. 1-13, Jun. 25, 2004.

"OMA DRM Requirements," Open Mobile Alliance, Approved Version 2.0, pp. 1-22, Mar. 3, 2006.

"DRM Specification," Open Mobile Alliance, Approved Version 2.0, pp. 1-142, Mar. 3, 2006.

* cited by examiner

TRANSFER OF DIGITAL RIGHTS MANAGEMENT INFORMATION

RELATED APPLICATION

This application claims priority under 35 U.S.C. §119 based on U.S. Provisional Application No. 60/820,668, filed Jul. 28, 2006, the disclosure of which is hereby incorporated herein by reference.

TECHNICAL FIELD

Implementations described herein relate generally to the transfer of digital rights management (DRM) information from one device to another.

DESCRIPTION OF RELATED ART

A DRM system protects content by separating the content from the rights associated with the content. Examples of content may include digital books and music. Accordingly, examples of content publishers, or content providers, may include book publishers and music labels. The content publisher encrypts the content and creates a Rights Object (RO) for the encrypted content. The RO may include the policies associated with the content, e.g. the RO may include (1) details about the rights granted to the content user regarding use or "rendering" of the content and (2) the decryption key to decrypt the content. When the user renders the content on his device, such as an MP3 player or personal computer (PC), a "DRM agent" in the device ensures that the user can render the content only according to the policies specified in the RO. Thus, the DRM agent prevents unauthorized rendering.

Using ROs, a content publisher may have other options to limit the rendering of content. As used herein, "rendering" means performing any function on DRM content, including playing, viewing, or copying. A content publisher may, for example, only allow a certain number of copies. A content publisher may, for example, allow rendering on a specific type of device (such as a mobile phone, for example) or a set of types of devices. The DRM agent securely manages the ROs in the user's device. In most DRM systems, ROs may be tied to a particular device (such as a particular mobile phone, for example) by encrypting the ROs with the device's public key. This means that when the user wishes to render content on a second device, he likely must purchase a new RO specific to the second device.

DRM schemes are specified by a various organizations, such as the Open Mobile Alliance (OMA), which specifies DRM 1.0 and DRM 2.0. When content is limited to one device (in DRM 1.0 and 2.0, for example) a problem may arise when the user replaces the device with a new device or a repaired device. The user may wish to copy content from the original device to the new or replacement device, especially if the user already paid for the content. For example, a user may buy a new mobile phone and may want to copy the music, protected by DRM, to his new phone. Further, a user may buy a new phone, for example, as an upgrade or because the user lost his or her previous mobile phone. DRM schemes, however, may limit the user's ability to make such copies. Further, it may be a nuisance for the content publisher to re-authenticate and allow the user to re-download the content.

SUMMARY

According to one aspect, a device including a communication interface and processing logic may be provided. The communication interface may receive digital rights management security information and content from a source device, the digital rights management information having been deactivated in the source device. The processing logic may reactivate the digital rights management security information and render the content according to the digital rights management security information.

Additionally, the communication interface may receive authorization to reactivate the digital rights management security information.

Additionally, the communication interface may further transmit confirmation of the reactivation of the digital rights management security information.

Additionally, the processor may decrypt the digital rights management security information.

Additionally, the device may be a mobile terminal.

According to yet another aspect, a method performed on a device may be provided. The method may include storing content and corresponding digital rights management security information; periodically attempting to receive authorization not to deactivate the digital rights management security information; allowing rendering of the content according to the digital rights management security information when the authorization is received; and deactivating the digital rights management security information when the authorization is not received.

Additionally, the method may include attempting to receive the authorization at least once every grace period.

Additionally, the method may include deactivating the digital rights management security information when the authorization is not received after a grace period.

Additionally, the method may include deactivating the device when the authorization is not received.

According to yet another aspect, a method performed in a device is provided. The method may include receiving digital rights management security information and content from a source device, the digital rights management information having been deactivated in the source device; reactivating the digital rights management security information; and rendering the content according to the digital rights management security information.

Additionally, the method may include receiving authorization to reactivate the digital rights management security information.

Additionally, the method may include transmitting confirmation of reactivation of the digital rights management security information.

Additionally, the method may include decrypting the digital rights management security information.

According to yet another aspect, a computer-readable medium for storing a plurality of instructions is provided. The instructions may cause a processor to render first content according to first digital rights management security information; transmit the first digital rights management security information and the first content; deactivate the first digital rights management security information; receive second digital rights management security information and second content; reactivate the second digital rights management security information; and render the second content according to the second digital rights management security information.

Additionally, an instruction may cause the at least one processor to receive authorization to deactivate the first digital rights management security information.

Additionally, an instruction may cause the processor to transmit confirmation of deactivation of the first digital rights management security information.

Additionally, an instruction may cause the processor to receive authorization to reactivate the second digital rights management security information.

Additionally, an instruction may cause the at least one processor to transmit confirmation of reactivation of the second digital rights management security information.

Additionally, an instruction may cause the at least one processor to repeatedly transmit the first digital rights management security information and the corresponding content.

Additionally, an instruction may cause the at least one processor to encrypt the first digital rights management security information before transmitting the first digital rights management security information.

According to yet another aspect, a method is provided that may include authorizing a source device to deactivate digital rights management security information corresponding to content, the source device having stored the digital rights management security information and the content; and authorizing a target device to reactivate the digital rights management security information corresponding to the content, the digital rights management security information and the content having been transmitted from the source device to the target device.

Other features and advantages will become readily apparent to those skilled in this art from the following detailed description. The embodiments shown and described provide illustration of the best mode contemplated for carrying out the invention. Embodiments shown and described below are capable of modifications in various obvious respects. Accordingly, the drawings are to be regarded as illustrative in nature, and not as restrictive.

BRIEF DESCRIPTION OF THE DRAWINGS

Reference is made to the attached drawings, where elements having the same reference number designation may represent like elements throughout.

DETAILED DESCRIPTION

The following detailed description refers to the accompanying drawings. The same reference numbers in different drawings identify the same or similar elements. The following detailed description does not limit the scope of the invention. Instead, the scope of the invention is defined by the appended claims and equivalents.

Exemplary Computing Environment

Figure 1:
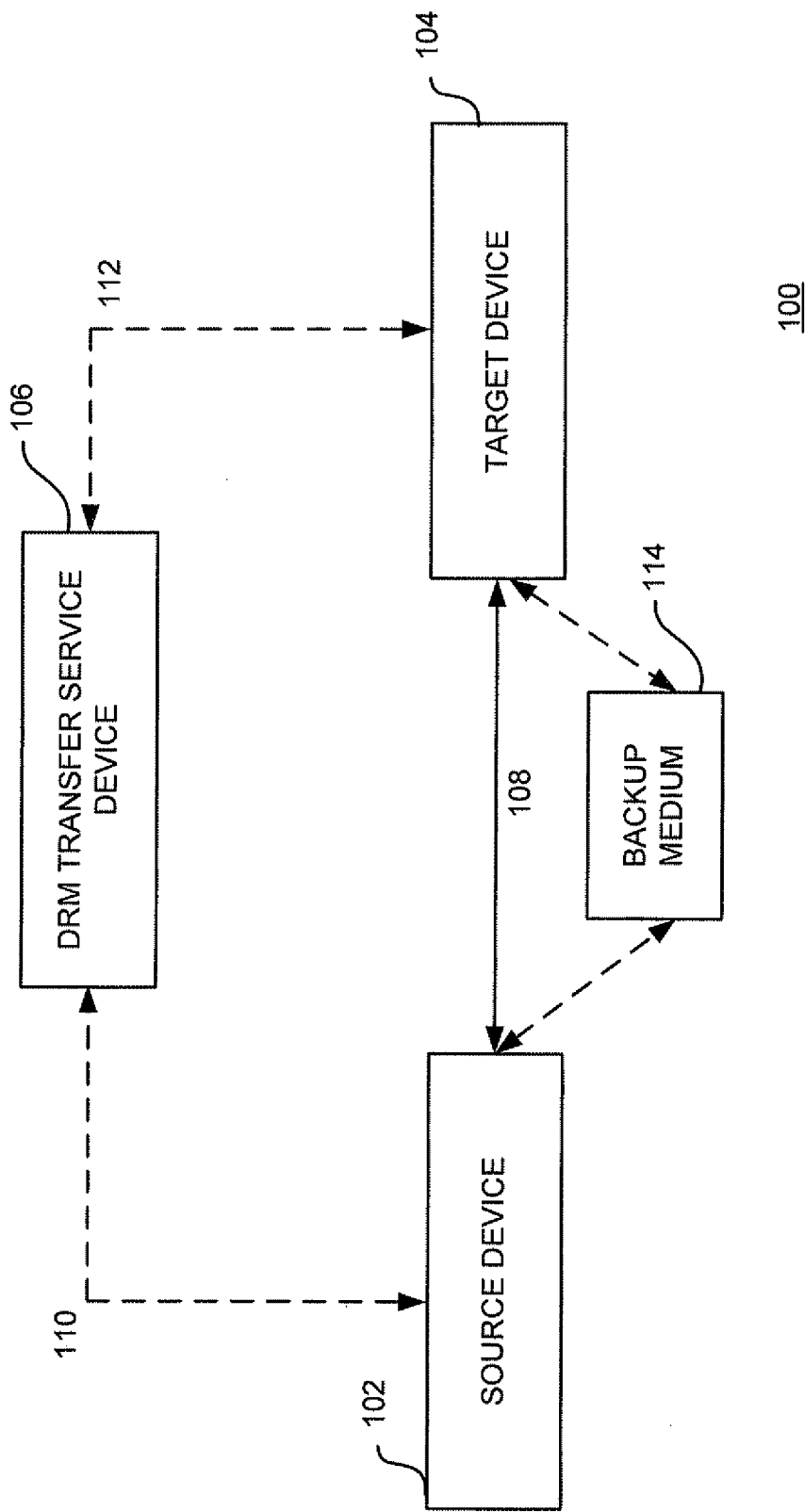
FIG. 1 is a block diagram of an exemplary computing environment in which methods and systems described herein may be implemented.

FIG. 1 is a block diagram of a computing environment 100 in which systems and methods described herein may be implemented. Computing environment 100 may include source device 102, target device 104, and DRM transfer service device ("transfer service" or "DRM transfer service") 106. The components of transfer service 106 are shown in more detail in FIG. 4, described below. In one embodiment, source device 102 and target device 104 may be mobile terminals. In another embodiment, source device 102 and target device 104 may not be mobile, e.g., source device 102 and target device 104 may be PCs.

In the exemplary embodiment of FIG. 1, source device 102 may transmit data to (1) target device 104 via communication link 108 or (2) DRM transfer service 106 via a communication link 110. Target device 104 may transmit data to (1) source device 102 via communication link 108 or (2) DRM transfer service 106 via communication link 112. DRM transfer service 106 may transmit data to (1) target device 104 via link 112 or (2) source device 102 via communication link 10. Communication links 110, 112, and 108 may be via wireless LAN, IrDA, Bluetooth, UMTS, radio, or wire. Communication links 110, 112, and 108 may be via computer-readable medium. For example, communication link 108 may be via backup medium 114, which is removed from source device 102 and inserted into target device 104. Backup medium 114 may include any type of removable memory device. Backup medium 114, for example, may also be a PC, network storage, memory card, or any other storage medium. Communication links 110, 112, and 108 (as well as any other communication links) may use protocols that provide error handling and correction to recover from lost connections and lost data. Communication links 110, 112, and/or 108 may be a secure and/or encrypted communication links. Communication links 110, 112, and/or 108 may use a standardized protocol such as transport layer security ("TLS").

In an exemplary embodiment, source device 102 initially stores DRM content for transfer to target device 104 for rendering on target device 104. In this embodiment, DRM transfer service 106 may supervise DRM rights transfer from source device 102 to target device 104 in a secure manner. Transfer service 106 may be a part of a network service provided by a mobile telephone network carrier, for example.

Figure 2:
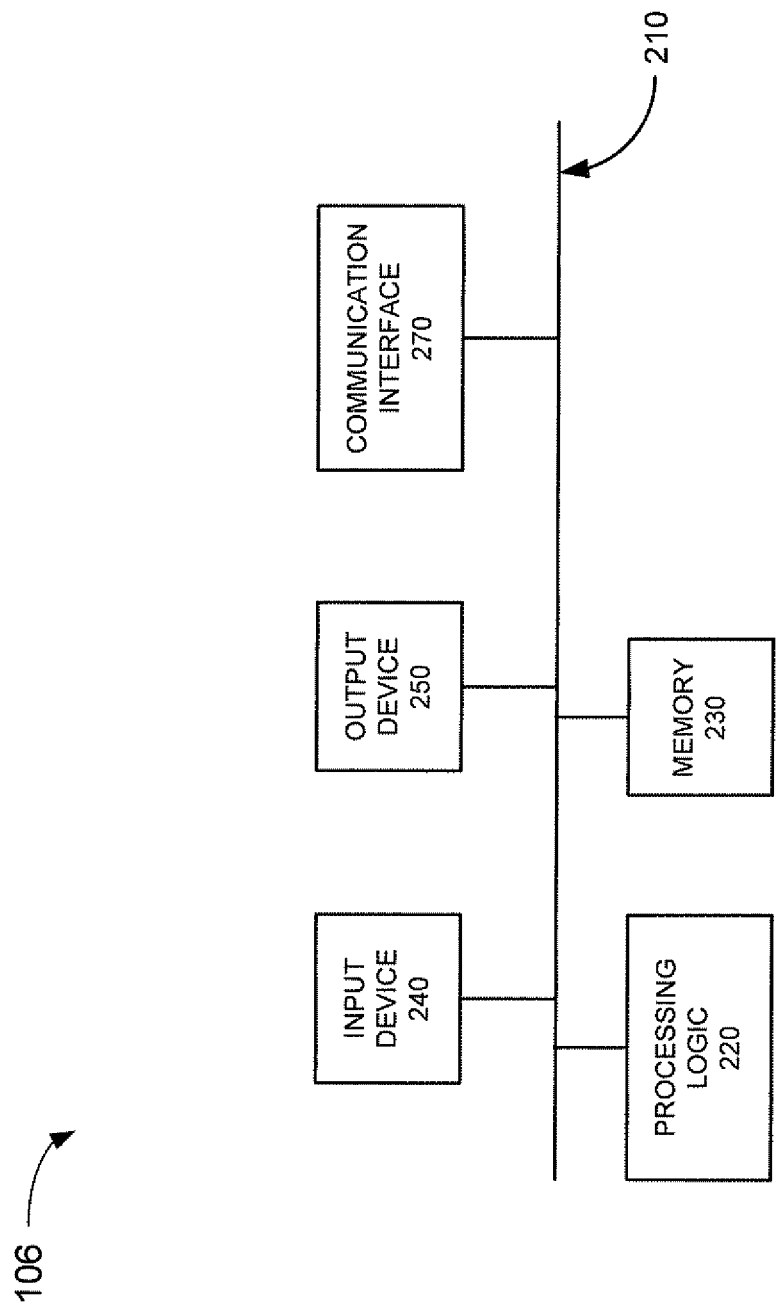
FIG. 2 is a block diagram of exemplary components of the transfer service of FIG. 1.

FIG. 2 is a block diagram of exemplary components of transfer service 106. Transfer service 106 may include bus 210, processing logic 220, memory 230, input device 240, output device 250, and communication interface 270. Bus 210 permits communication among the components of transfer service 106. Transfer service 106 may also include a modulator, a demodulator, an encoder, a decoder, etc., for processing data. Processing logic 220 may include a processor, microprocessor, an application specific integrated circuit (ASIC), field programmable gate array (FPGA) or the like. Processing logic 220 may execute software instructions/programs or data structures to control operation of target service 106.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220.

Input device 240 may include any mechanism that permits the user to input information to transfer service 106, such as a microphone, a keyboard, a keypad, a mouse, a pen, voice recognition and/or biometric mechanisms, etc. Input device 240 may also include one or more buttons, such as a button in user control area, that allows a user to receive a menu of options via output device 250. The menu may allow the user to select various functions or modes associated with applications executed by transfer service 106. Input device 240 may include one or more buttons in control area that allows a user to activate a particular mode for transfer service 106, such as a mode defined by an application running in transfer service 106. Output device 250 may include any mechanism that outputs information to the user, including a display, a speaker, etc.

Communication interface 270 may include any transceiver-like mechanism that enables transfer service 106 to communicate with other devices and/or systems. For example, communication interface 270 may include a modem or an Ethernet interface to a LAN. Communication interface 270 may also include other mechanisms for communicating via a network, such as a wireless network. For example, communication interface 270 may include one or more radio frequency (RF) transmitters and receivers and/or transceivers for communicating RF data. Communication interface 270 may also include one or more antennas for transmitting/receiving data, such as RF data. Communication interface 270 may also include an infrared (IR) transmitter and receiver and/or transceiver that enables communication interface 270 to communicate with other devices via infrared communications.

Transfer service 106 may perform processing associated with controlling various applications executed by transfer service 106 and/or controlling other devices. Transfer service 106 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more logical or physical memory devices and/or carrier waves. In alternative embodiments, hard-wired circuitry may be used in place of or in combination with software instructions to implement processes described herein. Thus, embodiments described herein are not limited to any specific combination of hardware circuitry and/or software.

Figure 3:
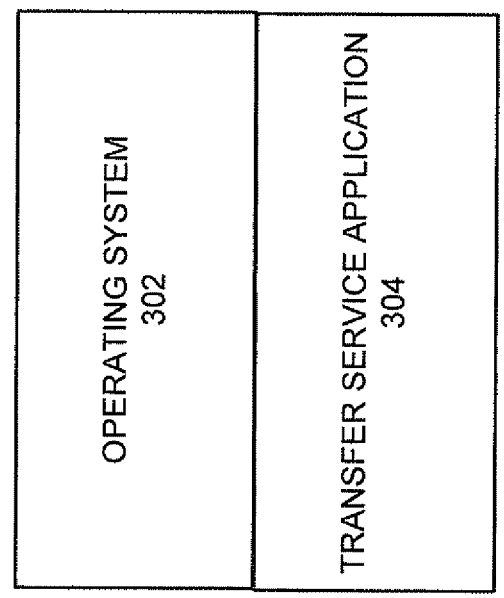
FIG. 3 is a functional block diagram of exemplary components implemented in the DRM transfer service of FIG. 2.

FIG. 3 is a functional block diagram of exemplary software components that may be implemented in transfer service 106 of FIG. 2, such as in memory 230. Referring to FIG. 3, memory 230 may include operating system 302 and transfer service application 304. Operating system 302 may provide a software platform on top of which application programs can run. Transfer service application 304 DRM may allow transfer service 106 to supervise DRM rights transfer from source device 102 to target device 104, for example. Memory 230 may include other application programs not shown in FIG. 3. Memory 230 may also include data used by operating system 302 or transfer service application 304.

Figure 4:
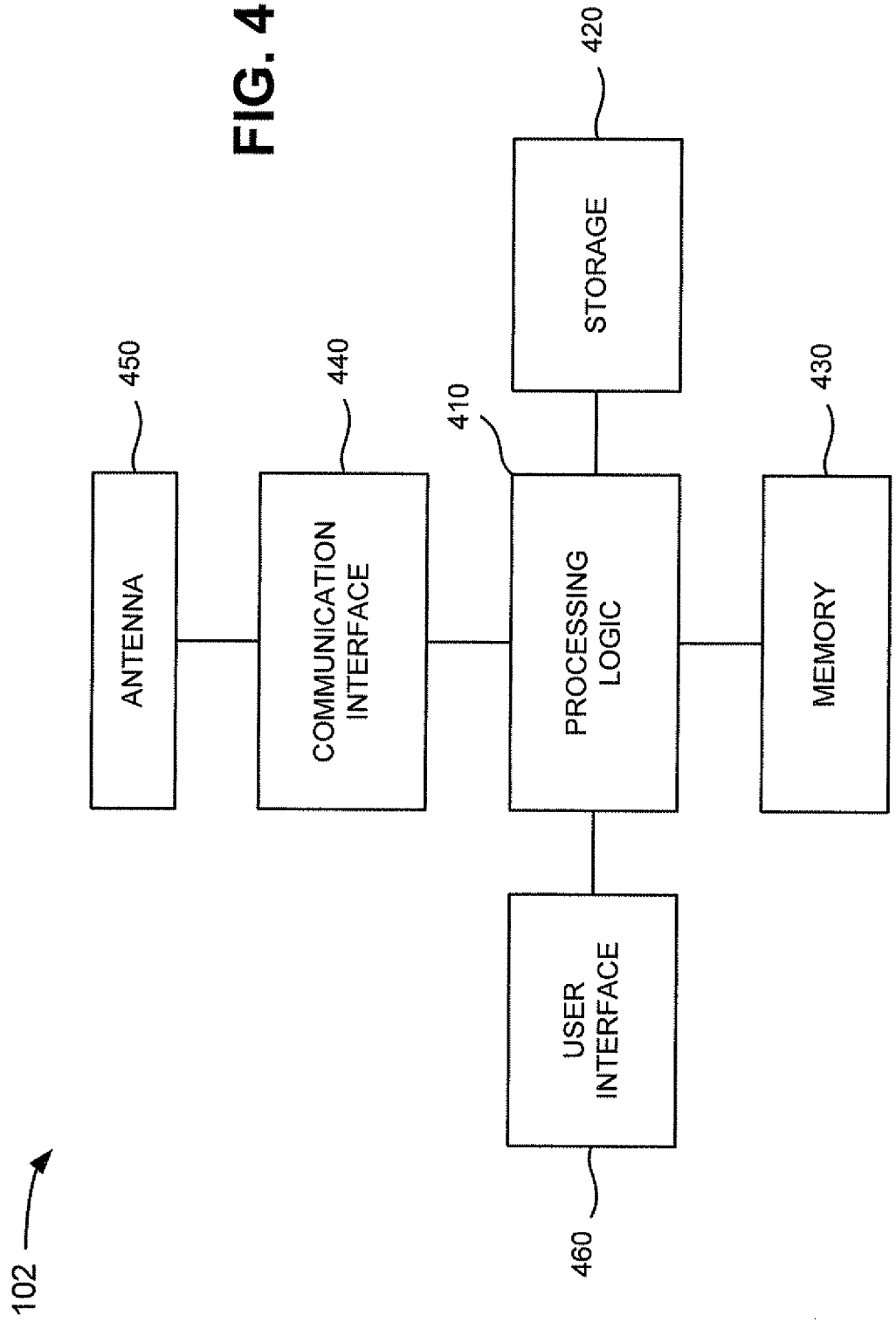
FIG. 4 is a block diagram of exemplary components of the source device of FIG. 1.

FIG. 4 is a diagram of exemplary components of source device 102. As shown in FIG. 4, source device 102 may include processing logic 410, storage 420, user interface 460, communication interface 440, antenna 450, and memory 430. Processing logic 410 may include a processor, microprocessor, an application specific integrated circuit (ASIC), field programmable gate array (FPGA), or the like. Processing logic 410 may include data structures or software programs to control operation of source device 102 and its components. Storage 420 may include a hard disk drive (HDD), a random access memory (RAM), a read only memory (ROM), and/or another type of memory to store data and instructions that may be used by processing logic 410, e.g., any type of a computer-readable memory. Memory 430 may include a random access memory (RAM), a read only memory (ROM), a hard disk drive (HDD), and/or another type of memory to store data and instructions that may be used by processing logic 410.

User interface 460 may include mechanisms for inputting information to source device 102 and/or for outputting information from source device 102. Examples of input and output mechanisms might include a speaker to receive electrical signals and output audio signals, a microphone to receive audio signals and output electrical signals, buttons to permit data and control commands to be input into transfer service 106, and/or a display to output visual information. The display may show content, such as pictures or movies. The speaker may play content, such as music or radio programming. User interface 460 may also include a vibrator mechanism that causes source device 102 to vibrate when, for example, an incoming call is received. User interface 460 may allow a user to receive a menu of options. The menu may allow the user to select various functions or modes associated with applications executed by source device 102. Source device 102 may include one or more buttons in control area that allows a user to activate a particular mode for source device 102, such as a mode defined by an application running in source device 102.

Communication interface 440 may include, for example, a transmitter that may convert baseband signals from processing logic 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna 450 for transmission and reception of the RF signals. Antenna 450 may include one or more antennas to transmit and receive RF signals over the air. Antenna 450 may receive RF signals from communication interface 440 and transmit them over the air and receive RF signals over the air and provide them to communication interface 440.

Figure 5:
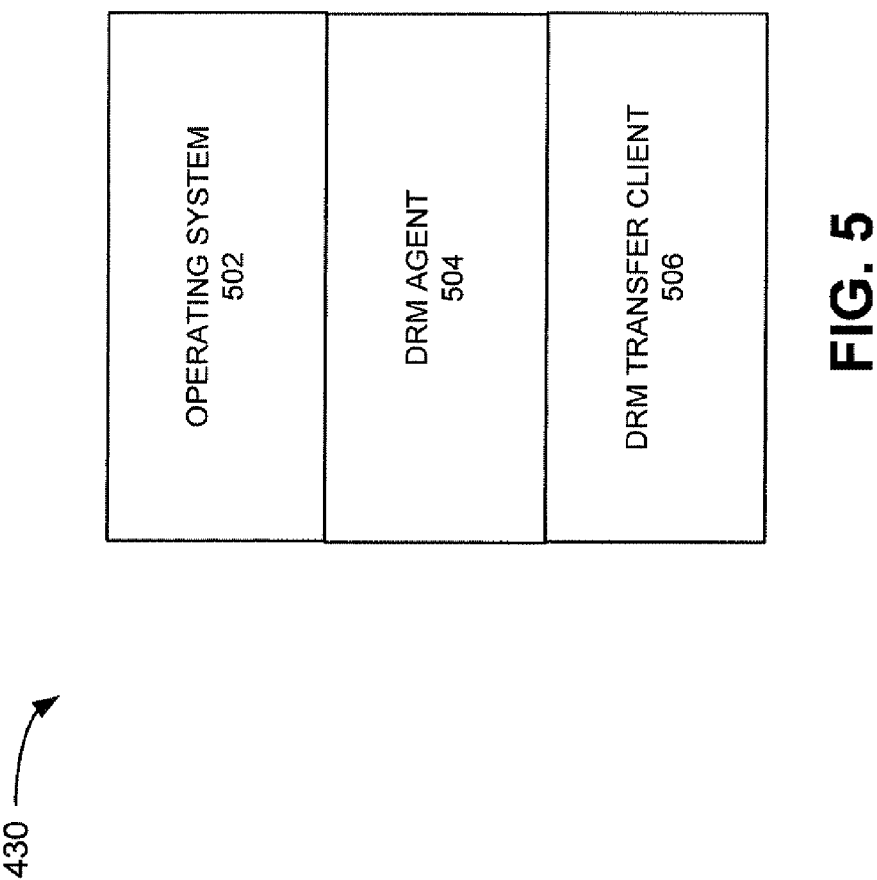
FIG. 5 is a functional block diagram of exemplary components implemented in the source device of FIG. 1 according to one exemplary embodiment.

FIG. 5 is a block diagram of exemplary software components that may be implemented in source device 102 of FIG.

4, such as in memory 430. Referring to FIG. 5, memory 430 may include operating system 502, DRM agent 504, and DRM transfer client ("transfer client") 506. Operating system 502 provides a software platform on top of which application programs, such as transfer client 506, can run. Transfer client 506 is described in more detail below. Memory 430 may include other application programs not shown in FIG. 5. Using ROs, for example, DRM agent 504 may enforce the permissions on the rendering of content pursuant to DRM 1.0 or DRM 2.0, for example. Memory 430 may also include data used by operating system 502, DRM agent 504, or DRM transfer client 506. This data may include DRM content, such as music, images, video, and electronic books.

Target device 104 may comprise the same or similar components as source device 102 as described with respect to FIG. 2. Target device 104 and source device 102 may each be a "mobile terminal." As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that may include a radiotelephone, pager, Internet/Intranet access, Web browser, organizer, calendar and/or a global positioning system (GPS) receiver; and/or a laptop and/or palmtop receiver or other appliance that may include a radiotelephone transceiver. A mobile terminal may also be referred to as a "pervasive computing" device. Although a "mobile terminal," such as a mobile telephone, may be used in some embodiments, some embodiments may incorporate devices that do not include communication functionality associated with making and receiving telephone calls. In these embodiments, the mobile terminal may include any client device, such as a PDA, a web-based appliance, a PC, or a laptop computer.

The mobile terminal may include a housing that may protect the components of the mobile terminal from outside elements. The mobile terminal may include a display screen and a user control area as part of user interface 460. The display screen may be a liquid crystal display (LCD) or some other type of display screen that allows the user to view text and/or images. The user control area may include controls associated with placing telephone calls via the mobile terminal. For example, the user control area may include a dial button, hang up button, etc. The user control area may also include a menu button that permits the user to view a menu associated with selecting functions, such as "play," "view," and "copy" content.

Figure 6:
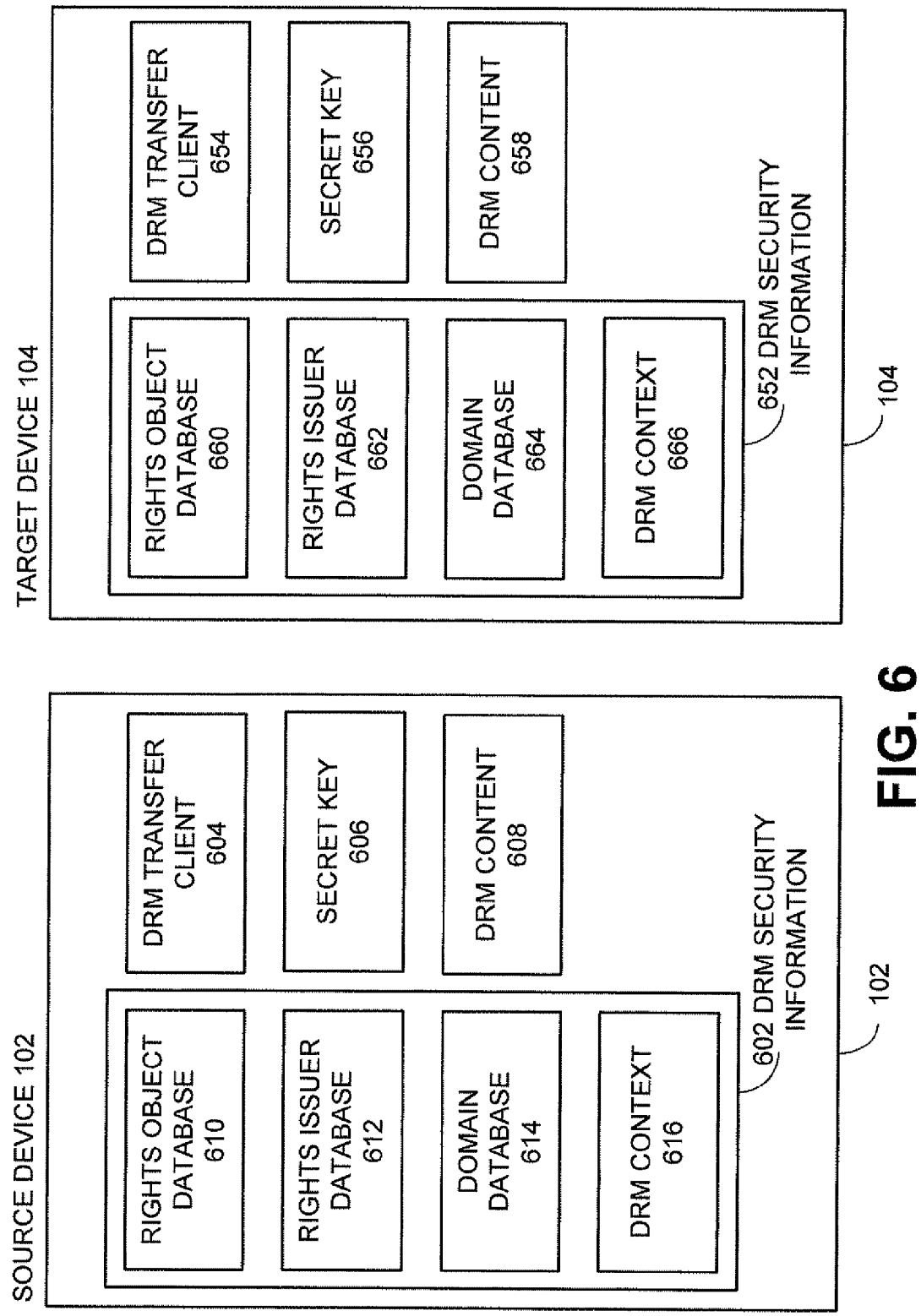
FIG. 6 is a block diagram of elements of the source device and the target device of FIG. 1.

FIG. 6 is block diagram of elements of source device 102 and target device 104 implementing methods and systems described below. Source device 102 may include DRM security information ("security information") 602, a DRM transfer client ("transfer client") 604, secret key 606, and DRM content 608. In one embodiment, secret key 606 may be unique to source device 102. DRM security information 602 may include rights object (RO) database 610, rights issuer database 612, domain database 614, and DRM context 616. As used herein, "DRM security information" means digital information that governs the rendering of content. For example, in one embodiment, "DRM security information" may include simply an RO database. Transfer clients 604 may be an application that helps coordinate the transfer of DRM security information 602 and DRM content 608 from one device to another, such as from source device 102 to target device 104. DRM content 608 may include music, images, video, and/or electronic books.

RO database 610 may include the policies associated with DRM content 608. RO database 610 may include "stateful rights" for which source device 102 explicitly maintains state information to correctly enforce permissions for rendering. Examples of state information may include the date/time of rendering or rendering count. A policy using a rendering count may be, for example, that a user cannot view a video more than twice. In this example, DRM agent 504 may keep a count of the number of renderings of the content.

Rights issuer database 612 may include a private key and certificate associated with a publisher of DRM content. Source device 102 may decrypt DRM content 608 with the appropriate private key from the rights issuer database 612. Source device 102 may ensure the "integrity" of the DRM content, e.g., makes sure the DRM content has not changed, using the appropriate certificate from rights issuer database 612. Domain database 614 may include information indicating what types of devices may be allowed to render DRM content 608. Types of devices may include, for example, a mobile phone, PC, or PDA.

DRM security information 602 may be encrypted using secret key 606, which makes the information only usable on source device 102. DRM content 608 may be kept separately and may be stored as files in a file system, such as in memory 430 or a hard disk drive, for example.

Target device 104 may include DRM security information 652, DRM transfer client ("transfer client") 654, secret key 656, and DRM content 658. In one embodiment, secret key 656 may be unique to target device 104. DRM security information 652 may include rights object (RO) database 660, rights issuer database 662, domain database 664, and DRM context 666. The functions of elements of target device 104 may be similar to those of source device 102 described above.

Transfer service 106, source device 102, and target device 104 may each have a "trusted area" where applications and data may reside. A "trusted area" provides a computing platform with which an unauthorized user cannot tamper. For example, DRM security information 602, 652 and transfer clients 604, 654 may be part of a "trusted area" where an unauthorized user cannot change DRM security information 602, 652 or transfer client 604, 654. Communication links 110 and 112 and transfer service 106 may be "trusted," meaning that an unauthorized user cannot alter links 110 and 112 or transfer service 106.

Exemplary Processing

In an exemplary embodiment, source device 102 initially stores DRM content 608 for transfer ("transfer content") and the corresponding DRM security information 602 that allows the transfer content to be used on source device 102. In this embodiment DRM content 608 is intended for transfer to target device 104 for rendering on target device 104. In this embodiment, DRM transfer service 106 may supervise DRM rights transfer from source device 102 to target device 104 in a secure manner. As used herein, "DRM rights transfer" means transferring DRM content and associated DRM rights, e.g., DRM security information, from one device to another.

Figure 7:
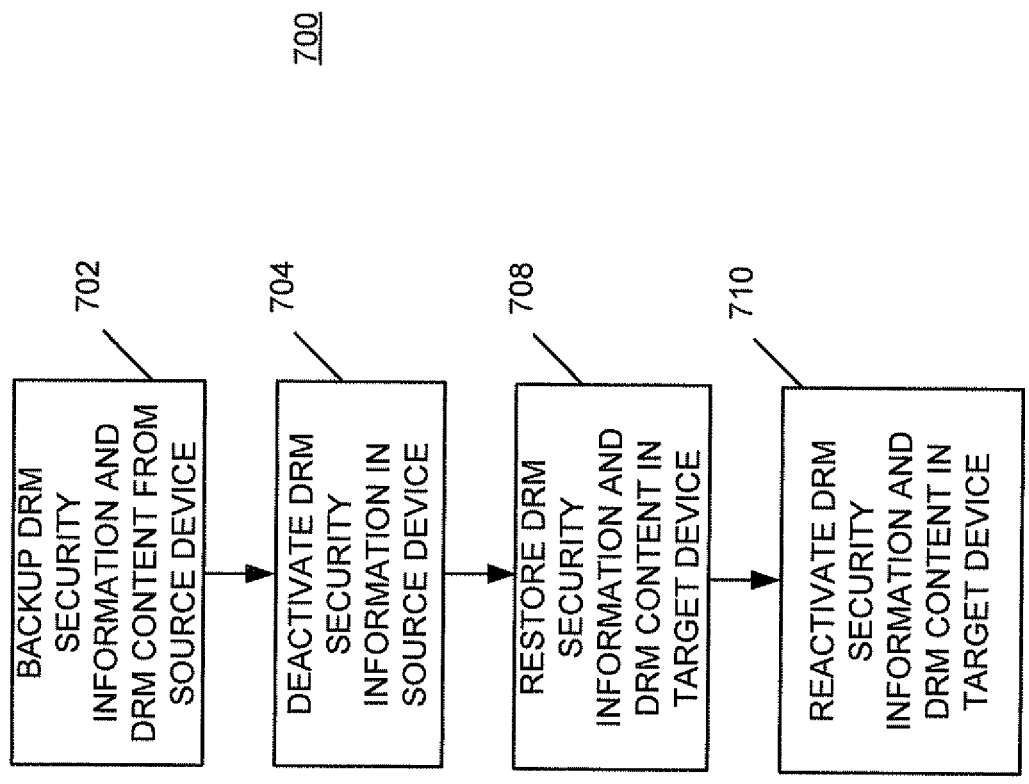
FIG. 7 is a flowchart of an exemplary process for transferring DRM rights from the source device to the target device of FIG. 1.

In one embodiment, transfer clients 604, 654 help coordinate operations during DRM rights transfer. FIG. 7 is a flowchart of an exemplary process 700 for transferring DRM rights from source device 102 to target device 104. Each of the blocks in FIG. 7 is described in more detail below with respect to FIGS. 8 and 10-12. Processing may begin with DRM security information 602 and DRM content 608 being backed up (block 702). Block 702 may be repeated one or more times on source device 102. In one embodiment, block 702 may be repeated on a regular basis. DRM security information 602 may be deactivated in source device 102 (block 704). As used herein, "deactivate" means to remove the ability to render DRM content that previously could be rendered. DRM security information 602 and DRM content 608 may be restored (block 708) as DRM security information 652 and DRM content 658 in target device 104. DRM security information 652 and DRM content 658 may be reactivated (block 710) in target device 104. As used herein, "reactivate" means to provide the ability of rendering previously deactivated DRM content. Although process 700 of FIG. 7 shows an order of blocks, this embodiment is not limited to any particular order of blocks.

Figure 8:
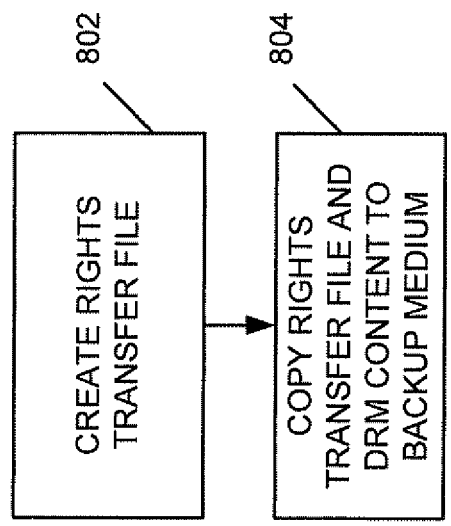
FIG. 8 is a flowchart of an exemplary process for backing up DRM security information and DRM content of the source device of FIG. 6.
Figure 9:
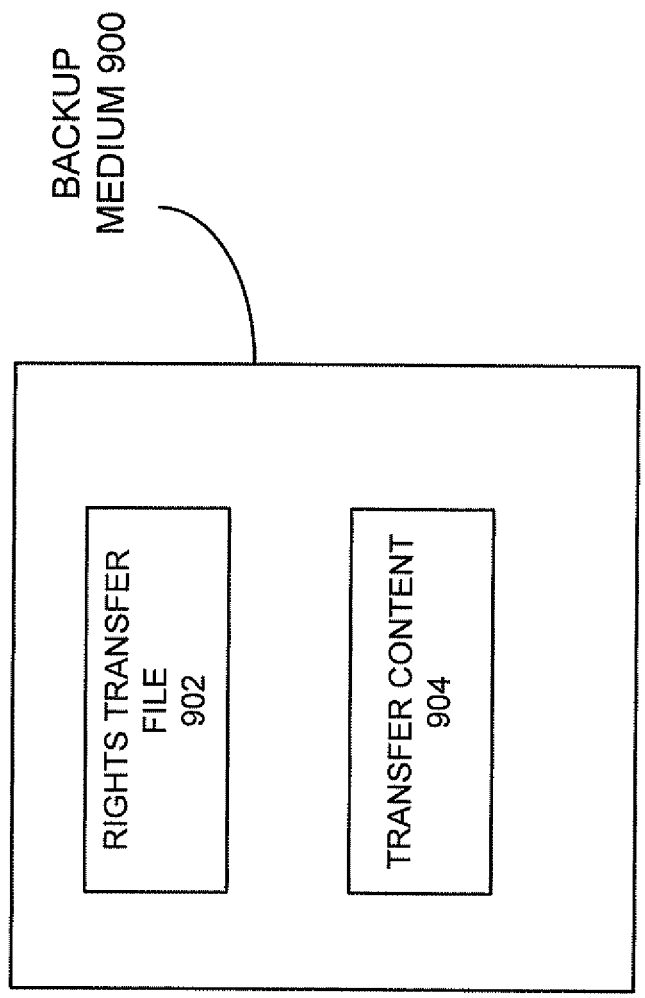
FIG. 9 is a block diagram of a backup medium.

FIG. 8 is a flowchart of an exemplary process 702 for backing up DRM security information 602 and DRM content 608 of source device 102. FIG. 9 is an exemplary block diagram of backup medium 114 that may include rights transfer file 902 and transfer content 904. DRM transfer client 604 creates a rights transfer file 902 that may include DRM security information 602 (block 802). Rights transfer file 902 may be encrypted with a backup key and integrity protected with a backup certificate. The backup key may be user defined. The backup certificate may be specific to transfer client 604. In one embodiment, DRM security information may be decrypted with secret key 606 before being encrypted with the backup key. In another embodiment, rendering rights in DRM rights transfer file 902 may be temporarily turned off, e.g., they are deactivated. DRM rights transfer file 902 and DRM content 608 for transfer ("transfer content 904") may be copied to, e.g., transmitted to, backup medium 114 (block 804). Backup medium 114 may receive transfer content 904 and DRM rights transfer file 902 via wireless LAN, Bluetooth, radio, or wire, for example. Although process 702 of FIG. 8 shows an order of blocks, this embodiment is not limited to any particular order of blocks.

Backup medium 114 may be trusted or un-trusted. Backup medium 114, for example, may be a PC, network storage, memory card, or any other storage medium. Further, it may be possible to backup non-DRM content or other non-DRM information at the same time as backing up DRM security information 602 and DRM content 608. Further, rights transfer file 902 may be a subset of the DRM security information 602. Also, transfer content 904 may be a subset of DRM content 608.

Figure 10:
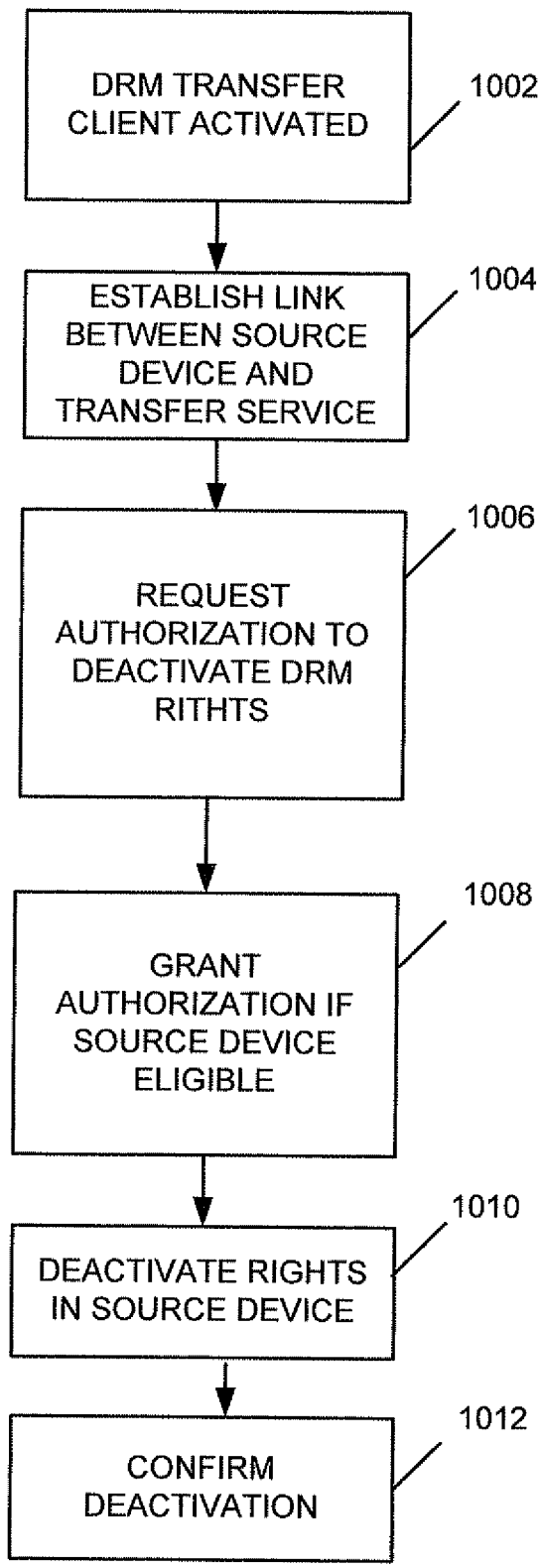
FIG. 10 is a flowchart of an exemplary process for deactivating DRM rights in the source device of FIG. 6.

FIG. 10 is a flowchart of an exemplary process 704 for deactivating DRM rights in source device 102. DRM transfer client 604 may be activated in source device 102 and a DRM deactivation function may be initiated (block 1002). Communication link 110 may be established between source device 102 and transfer service 106 (block 1004). Communication link 110 may be a secure and/or encrypted communication link. Both transfer client 604 and transfer service 106 may also be authenticated. Communication link 110 may use a standardized protocol such as transport layer security ("TLS"). Transfer client 604 may request authorization from transfer service 106 to deactivate DRM rights in source device 102 (block 1006). Transfer service 106 may grant authorization to transfer client 604 it for example, source device 102 is eligible to transfer DRM security information 602 and DRM content 608 (block 1008). DRM transfer service 106 may determine if source device 102 is eligible, for example, by comparing source device 102 against a list of devices. If source device 402 is eligible, rights may be deactivated in source device 102 (block 1010), e.g., DRM security information 602 is deactivated. Deactivation may be accomplished by removing DRM security information 602 and DRM content 608, for example, or by changing privileges in RO database 610. After deactivation, source device 102 may not allow rendering of DRM content 608. Transfer client 604 confirms deactivation to transfer service 106 (block 1012). During process 704, target device 104 may not be available or known. Although process 704 of FIG. 10 shows an order of blocks, this embodiment is not limited to any particular order of blocks.

Figure 11:
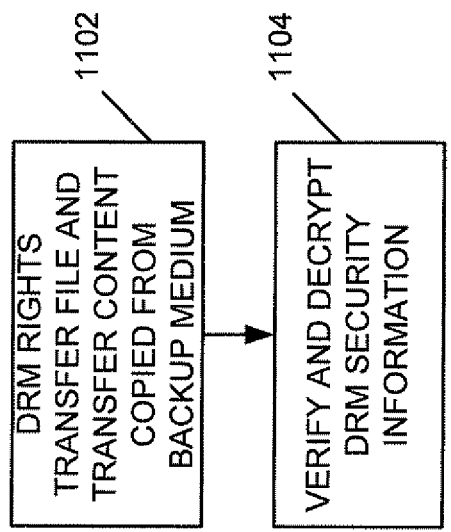
FIG. 11 is a flowchart of an exemplary process for restoring the rights transfer file and the transfer content of FIG. 9.

FIG. 11 is a flowchart of an exemplary process 708 for restoring rights transfer file 902 and transfer content 904. In one embodiment, process 708 can only occur after process 704 for deactivation of DRM security information 602 and DRM content 608. DRM rights transfer file 902 and transfer content 904 may be copied from backup medium 114 (block 1102) as DRM security information 652 and DRM content 658, e.g., target device 104 receives DRM security information 652 and DRM content 658. DRM transfer client 654 may verify the integrity of DRM security information 652 using the backup certificate (block 1104). If rights transfer file 902 is encrypted, transfer client 654 may decrypt rights transfer file 902 before copying rights transfer file 902 as DRM security information 652 or may decrypt DRM security information 652 (block 1104). Target device 104 may receive transfer content 904 and DRM rights transfer file 902 via wireless LAN, Bluetooth, radio, or wire, for example. Although process 708 of FIG. 11 shows an order of blocks, this embodiment is not limited to any particular order of blocks.

When a backup key or certificate is used when creating rights transfer file 902, the backup key and/or certificate may be stored on backup medium 114. Alternatively, the backup key and/or certificate may be kept by the user and entered by the user when needed. The backup key and/or certificate may also be stored on a memory stick or SIM or transmitted via SMS. In one embodiment, backup key or certificate may be transferred over a secure channel.

Figure 12:
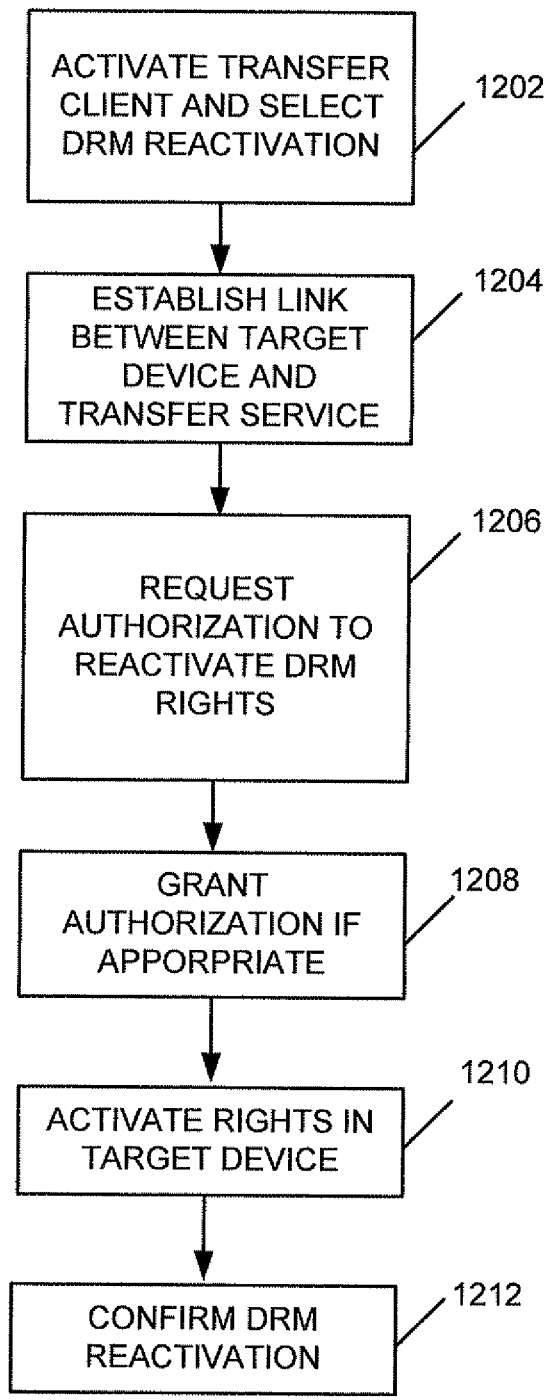
FIG. 12 is a flowchart of an exemplary process for reactivating DRM security information and DRM content in the target device of FIG. 6.

FIG. 12 is a flowchart of an exemplary process 710 for reactivating DRM security information 652 and DRM content 658 in target device 104. Source device 102 may or may not be available during reactivation. Transfer client 654 in target device 104 may be activated and DRM reactivation may be selected (block 1202). A user, for example, may activate transfer client 654 and select DRM reactivation. A secure link may be established between target device 104 and transfer service 106 (block 1204) via communication link 108. The secure link may be secure by use of encryption and/or both target device 104 and transfer service 106 may be authenticated. The secure link may use various communication protocols, including standard protocols such as TLS. Transfer client 654 may request authorization from transfer service 106 to reactivate DRM rights in target device 104 (block 1206). If appropriate, authorization may be granted by transfer service 106 (block 1208). Transfer service 106 may determine if authorization should be granted (block 1208) by comparing target device 104 against a list of devices. If transfer service 106 grants authorization, transfer client 654 may reactivate rights in target device 104 (block 1210), e.g., transfer client 654 may reactivate DRM security information 652. Transfer client 654 may reactivate rights, for example, by altering the contents of ROs stored in DRM security information 652 or by encrypting DRM security information with secret key 656 and target device 104 allows DRM content 658 to be rendered, Transfer client 654 may confirm DRM reactivation to transfer service 106 (block 1212). Although process 710 of FIG. 12 shows an order of blocks, this embodiment is not limited to any particular order of blocks.

Transfer client 604 in source device 102 may be capable of providing the same functionality of transfer client 654 in target device 104. Likewise, transfer client 654 in target device 104 may be capable of providing the same functionality of transfer client 604 in source device 102. In other words, the transfer clients in source device 102 and target device 104 may be functionally equivalent, e.g., the labels "source" and "target" are used for convenience of description. For example, Alice may purchase a new phone and wish to transfer DMA content (first content and corresponding first DMA security information) from her old phone to her new phone. In this case, Alice's old phone may be a source device and Alice's new phone may be a target device. But, if Alice gives her old phone to Bob, Bob may want to transfer DMA content (second content and corresponding second DMA security information) from Bob's old phone to his new phone, which is really Alice's old phone. In this case, Bob's old phone may be a source device and Alice's old phone may be a target device. Therefore, Alice's old phone may have to act as both a source device and a target device, and may have a transfer client that can perform the duties of both. Alice's old phone, therefore, may transmit (backup) the first content and first DMA security information and receive (restore) the second content and second DMA security information. A personal password or certificate may be used to prevent Bob from activating Alice's content in Bob's new phone. This personal key or certificate may be transmitted over a trusted or secure channel.

Source device 102, target device 104, and transfer service 106 may each be a "trusted" device. Environment 100 may also implement "integrity protection," which allows transfer service 106, source device 102, or target device 104 to determine when DRM security information 602 or DRM content 608, for example, has been altered by an unauthorized user. Because DRM content 608 and DRM security information 602 may be encrypted and integrity protected, DRM content 608 and security information 602 may be securely transferred over a non-trusted medium.

In the embodiments described in FIGS. 6-12, DRM rights may be active in at most one of source device 102 or target device 104 at any given point in time. During transfer of rights, in fact, DRM rights may not be active in either source device 102 or target device 104. During the transfer of rights, DRM rights may be considered as active in transfer service 106. In one embodiment, user authentication may be used to prevent DRM security information 602 from being stolen during transfer.

Figure 13:
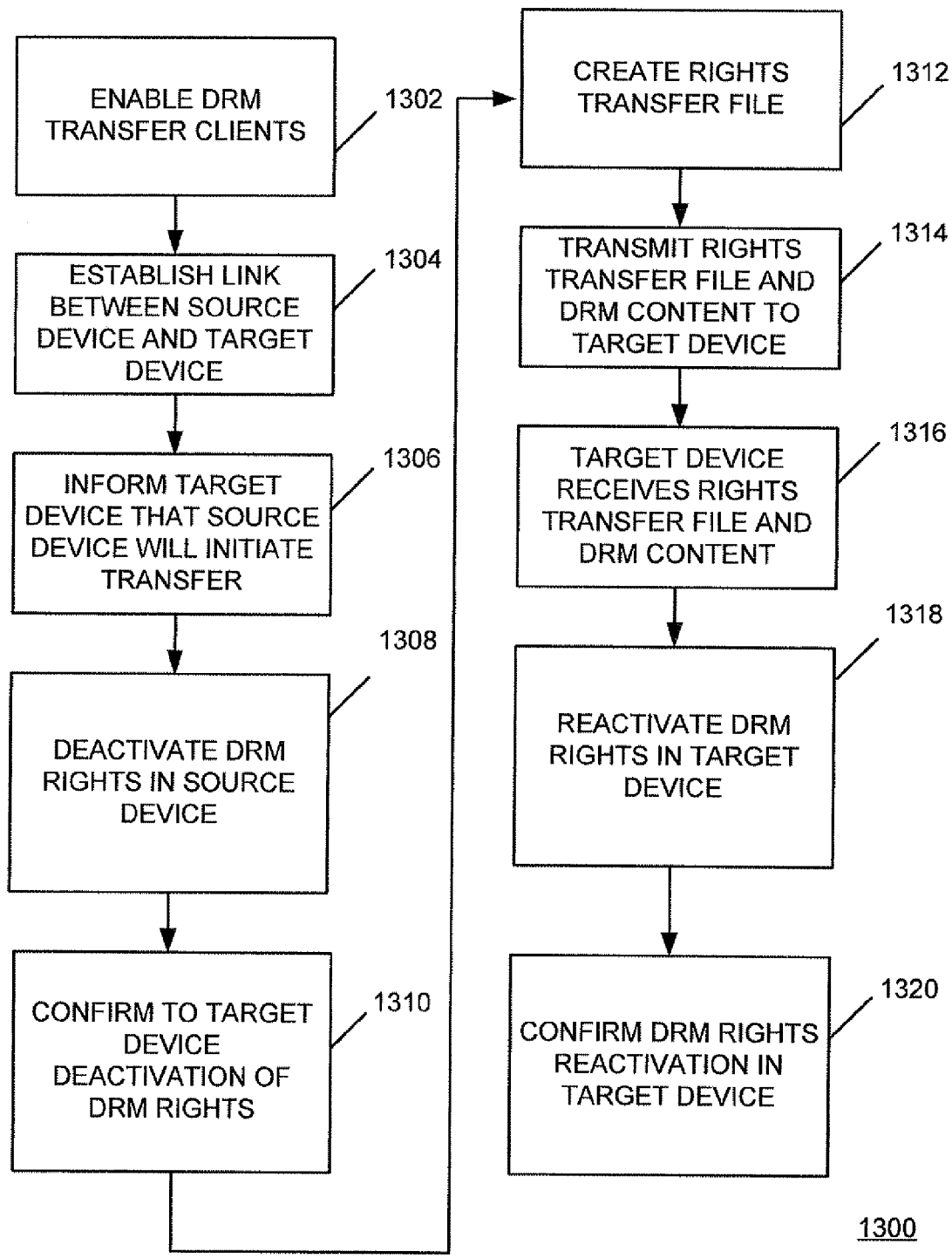
FIG. 13 is a flowchart of an exemplary process for transferring DRM rights from the source device to the target device of FIG. 1.

One embodiment supports DRM transfer directly between source device 102 and target device 104 (1) without the communication between source device 102 and transfer service 106 described above in connection with FIGS. 6-12 and (2) without the communication between target device 104 and transfer service 106 described above in connection with FIGS. 6-12. FIG. 13 is a flowchart of an exemplary process 1300 for transferring DRM rights from source device 102 to target device 106. In this embodiment, DRM transfer clients 604 and 654 are enabled in source device 102 and target device 104 (block 1302). Source device 102 may be identified as the source and target device 104 may be identified as the target. The user may both enable transfer clients 604 and 654 and identify the source and target. A secure link may be established between source device 102 and target device 104 (block 1304) via communication link 108. The secure link may be encrypted. Both source device 102 and target device 104 may be authenticated. The secure link may use various communication protocols, such as the standard protocol TLS.

Source device 102 informs target device 104 that source device 102 may initiate the deactivation and transfer DRM rights (block 1306). Transfer client 604 deactivates DRM rights in source device 102 (block 1308), e.g., DRM security information 602 may be deactivated. Source device 102 may not allow any DRM content to be rendered after deactivation. Source device 102 confirms DRM deactivation to target device 104 (block 1310). Transfer client 604 creates rights transfer file 902 (block 1312). Rights transfer file 902 may include DRM security information 602. In one embodiment, source device 102 encrypts rights transfer file 902 using a backup key and creates a certificate specific to transfer client 604. The backup key may be user defined. Rights transfer file 902 and DRM content 608 for transfer (transfer content 904) may be copied, e.g., transmitted or transferred, to target device 104 via communication link 108, which may include backup medium 114 (block 1314). Communication link 108 and backup medium 114 may be trusted or un-trusted. Target device 104 may receive, decrypt, and authenticate rights transfer file 902 and transfer content 904 using service certificate and the backup key (block 1316). Transfer client 654 reactivates rights in target device (block 1318), e.g., transfer client 654 reactivates DRM security information 652. Target device 104 allows DRM content 658 to be rendered. Target device 104 may confirm DRM reactivation to source device 102 (block 1320).

Processes 700 and 1300 may involve source device 102 being available at some point after transfer is initiated. Source device 102 may not be available, for example, if it is lost or stolen. In one embodiment, DRM security information 602 may be time limited to a certain grace period (e.g. one month). If the grace period is exceeded, DRM security information 602 may be deactivated and DRM content 608 can no longer be rendered. During normal use, the grace period may be updated automatically on a regular basis so that DRM security information 602 may remain activated. Updating of the grace period may be managed though a secure and trusted network service, such as transfer service 106. In this embodiment, DRM security information 602 may be deactivated by ignoring grace period update requests from source device 102. In this embodiment, transfer service 106 may not need to directly access source device 102 to deactivate DRM security information 602. In this embodiment, transfer content 904 and rights transfer file 902 may be restored in target device 104 without having DRM security information 602 "clones" in source device 102. In this embodiment, backup process 702 may be performed on a regular basis so that rights transfer file 902 and transfer content 904 may exist when source device 102 is lost or stolen, for example.

Figure 14:
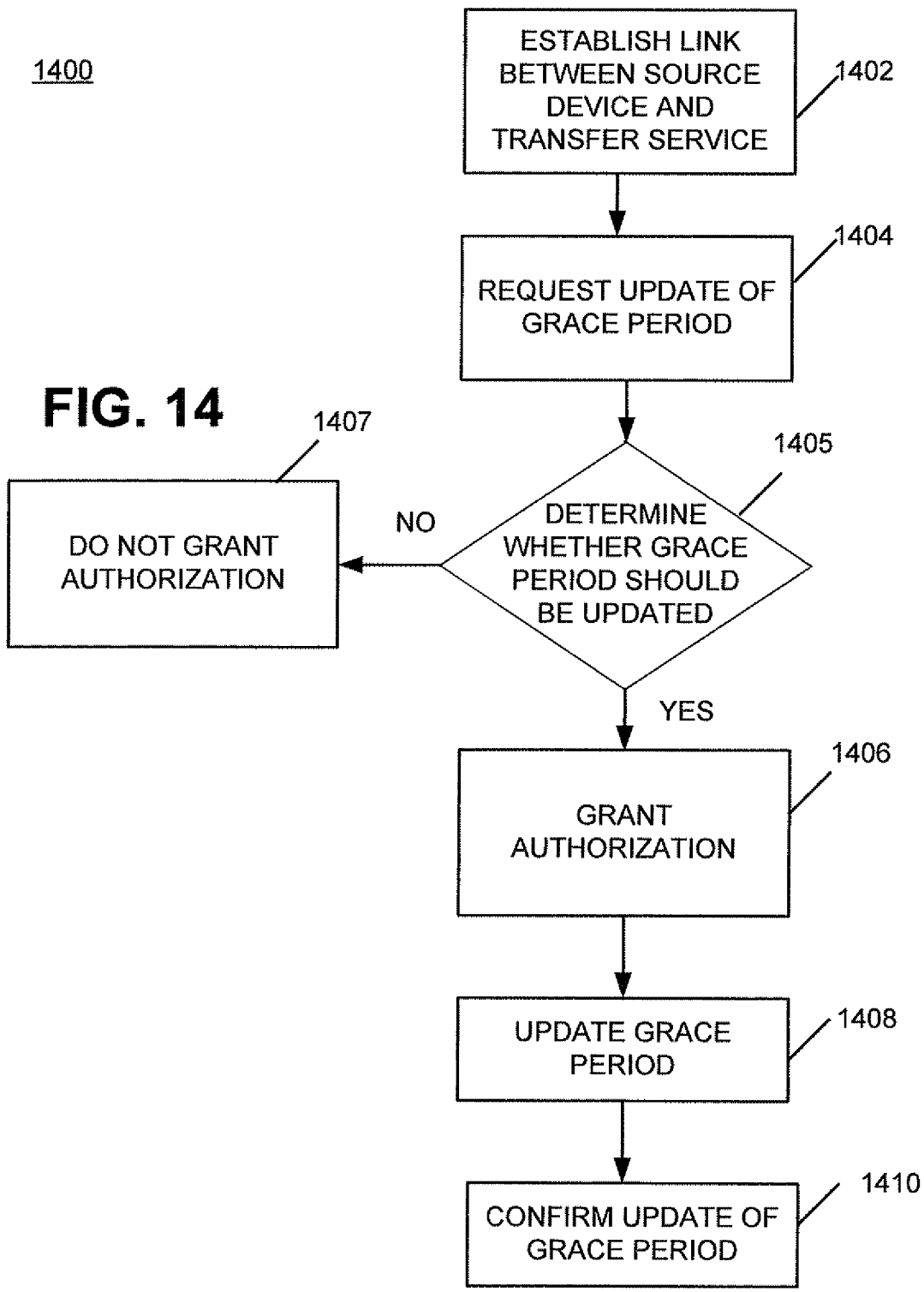
FIG. 14 is a flowchart of an exemplary process for transferring DRM rights from the source device to the target device of FIG. 1 using a grace period.

FIG. 14 is a flowchart of an exemplary process 1400 for transferring DRM rights from source 102 to target 104 using a grace period. Process 1400 may be automatically initiated by transfer service 106 or transfer client 604 on a regular basis. A secure link may be established between source device 102 and transfer service 106 (block 1402) via communication link 108. The secure link may be encrypted. Both source device 102 and transfer service 106 may be authenticated. The secure link may use various communication protocols, such as the standard protocol TLS. Transfer client 604 may request update of the DRM grace period (block 1404). Transfer service 106 determines whether the DRM grace period should be updated (block 1405). Authorization may be granted by transfer service 106 (block 1406) if, for example, source device 102 is not listed as lost or stolen. Authorization may not be granted by transfer service 106 (block 1407), for example, if source device 102 is listed as lost or stolen. Authorization also may not be granted by transfer service 106 (block 1407), for example, if target device 104 has requested reactivation of DRM rights. If transfer service 106 grants updating of the grace period, transfer client 604 may update the grace period in source device 102 (block 1408) and transfer client 604 may confirm updating the grace period with transfer service 106 (block 1410). If transfer service 106 does not grant updating of the grace period, transfer client 604 may not update the grace period and transfer client 604 deactivates DRM security information 602 and source device 102 may not render DRM content 608.

In another embodiment, if transfer service 106 does not grant updating of the grace period, transfer client 604 does not update the grace period and source device 102 may be disabled, making a stolen device useless to a thief. After transfer service 106 denies a request to update the grace period, transfer client 604 and/or transfer service 106 may no longer make such requests on a regular basis.

Figure 15:
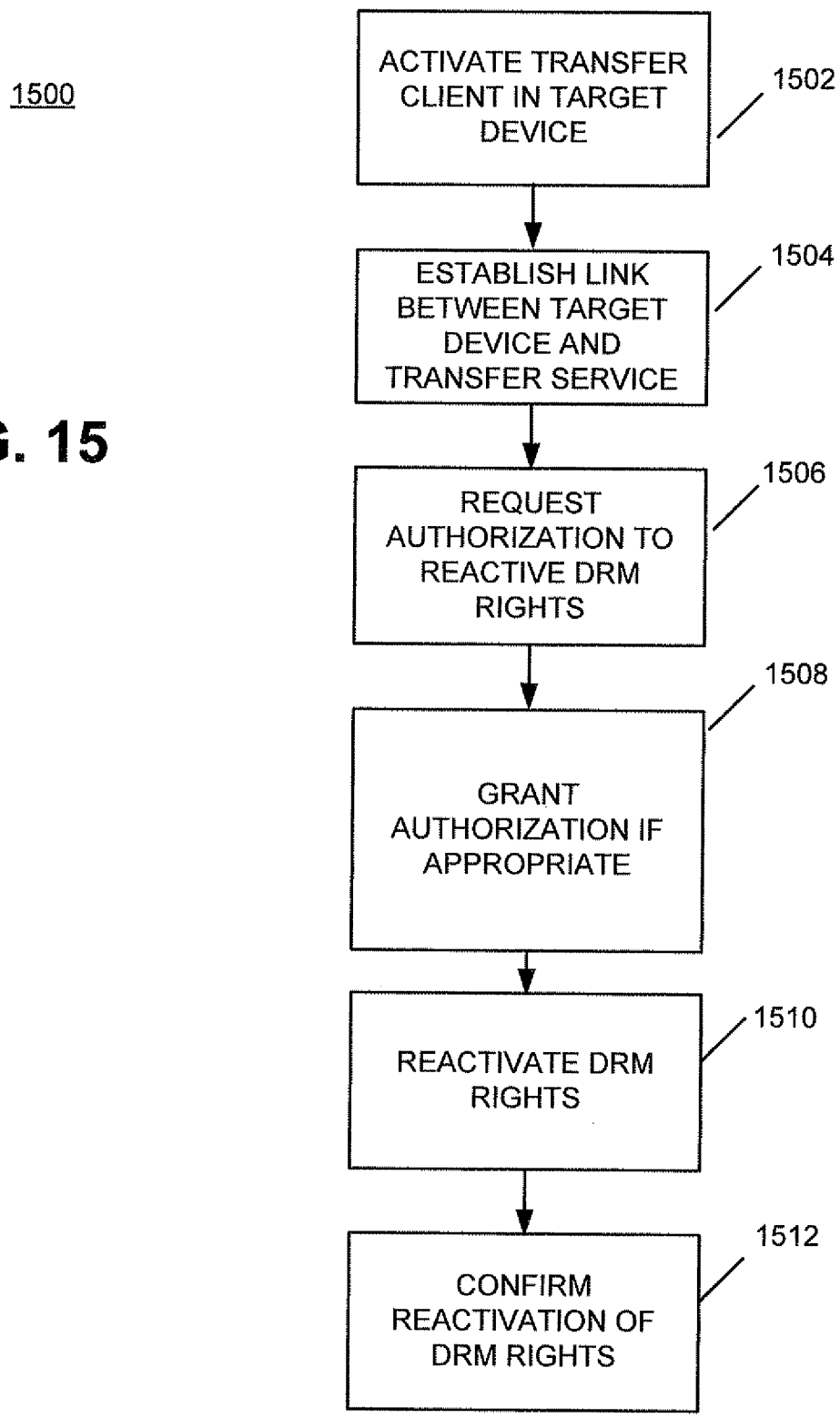
FIG. 15 is a flowchart of an exemplary process for reactivating DRM rights of the target device of FIG. 1.

FIG. 15 is a flowchart of an exemplary process 1500 for reactivating rights in a DRM database of target device 104. Before process 1500 starts, source device 102 may be listed as lost or stolen, and a backup of DRM security information 602 and DRM content 608 is restored to target device 104 pursuant to process 708, for example. According to process 1500, transfer client 654 is activated in target device 104 and DRM reactivation may be selected (block 1502). A user may activate DRM transfer client 654 and select DRM reactivation. A secure link may be established between target device 102 and transfer service 106 (block 1504) via communication link 112. The secure link may be established, for example, using encryption. Further, both transfer client 654 and transfer service 106 may be authenticated. Communication link 112 may use various communication protocols, including standard protocols such as TLS. Transfer client 654 may request authorization from transfer service 106 to reactivate DRM rights in target device 104 (block 1506). Transfer service 106 may grant authorization to transfer client 654 (block 1508) it for example, source device 102 is listed as lost or stolen. If authorization is granted, transfer client 654 reactivates rights in DRM security information 652 and target device 104 allows rendering of DRM content 658 (block 1510). Transfer client 654 confirms DRM reactivation to transfer service (block 1512). In one embodiment, source device 102 may be listed as lost or stolen after DRM security information 652 and DRM content 658 may be reactivated on target device 104.

According to one aspect, if Alice buys a new mobile telephone, she can transfer her DRM content, all music, from her old phone to her new phone. Alice may, for example, place a flash memory card into her old phone and activate a transfer client in her old mobile phone and request deactivation of her DRM content in her old mobile phone. The transfer client in her old mobile phone may request authorization from her mobile carrier, e.g., a transfer service. The mobile carrier may grant authorization and the transfer client in Alice's old phone may copy Alice's DRM security information and DRM content to Alice's flash memory card (as DRM right transfer file and DRM content on the memory card). The transfer client may also deactivate the DRM rights in the old mobile phone to Alice's DRM content. At that point, Alice cannot play her music on her old mobile phone. Alice may remove the flash memory card from her old phone and put it into her new phone. Alice may activate the DRM transfer client in her new phone and initiate a request for authorization to activate DRM rights in her new phone. The transfer client may request authorization from her mobile carrier, which grants authorization. The transfer client in her new mobile phone copies the DRM content, Alice's music, and the DRM rights transfer file from the flash memory drive to Alice's new phone. The transfer client in Alice's new phone reactivates the DRM rights and Alice can play her music on her new phone.

According to yet another aspect, the transfer clients in Alice's new and old phone do not have to make authorization requests from Alice's mobile telephone carrier, e.g., the transfer service.

According to yet another aspect, if Alice loses her phone and cannot copy her music from her old phone to her new phone, Alice reports her phone as lost to her mobile carrier, e.g., a transfer service. The DRM rights in Alice's old phone may expire after a grace period because Alice's mobile carrier may not authorize an update of the grace period for Alice's old phone. Alice can restore her DRM content, e.g., her music, from a backup copy of her DRM content and DRM security information (her rights transfer file). Alice can play her music on her new phone even though she does not have her old phone any more. Further, Alice's old phone can be rendered useless as a device altogether because Alice's mobile carrier did not authorize an update the grace period for Alice's old phone.

CONCLUSION

Implementations described herein may allow a user to transfer content from one mobile terminal, for example, to another without having to purchase the content again—while still protecting the rights of the content rights owner. Further, embodiments allow a user to restore content to a new mobile terminal when, for example, the user loses an original mobile terminal.

Implementations described herein may not depend on any DRM standard or scheme. Implementations herein may not depend on interaction with the content publisher. Implementations herein may not depend on interaction with a transfer service, such as a network provider. In another embodiment, implementations herein may depend on interaction with a transfer service, such as a network provider. Implementations herein may require minimal network bandwidth. Implementations herein may allow for transfer of content and DRM information over un-trusted media.

The foregoing description of the embodiments provide illustration and description, but is not intended to be exhaustive or to limit the claims to the precise form disclosed. Modifications and variations are possible in light of the above teachings or may be acquired from practice of the invention.

It will also be apparent to one of ordinary skill in the art that embodiments, as described above, may be implemented in cellular communication devices/systems, methods, and/or computer program products. Accordingly, embodiments may be implemented in hardware and/or in software (including, for example, firmware, resident software, micro-code, etc.). Furthermore, aspects may take the form of a computer program product on a computer-usable or computer-readable storage medium having computer-usable or computer-readable program code embodied in the medium for use by or in connection with an instruction execution system. The actual software code or specialized control hardware used to implement aspects do not limit the claims below. Thus, the operation and behavior of the aspects may have been described without reference to the specific software code—it being understood that one of ordinary skill in the art would be able to design software and control hardware to implement the aspects based on the description herein.

Further, certain portions of embodiments may be implemented as "logic" that performs one or more functions. This logic may include hardware, such a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method performed on a device, where the method comprises:
   storing content and corresponding digital rights management security information received, via a network, from a source device that previously played at least a portion of the content;
   automatically attempting to receive authorization not to deactivate the digital rights management security information at regular intervals;
   allowing rendering of the content according to the digital rights management security information when the authorization is received; and
   deactivating the digital rights management security information when the authorization is not received.

2. The method of claim 1, where the digital rights management security information was deactivated prior to storing the digital rights management security information, and
   where automatically attempting to receive the authorization at regular intervals comprises attempting to receive the authorization at least once every period of time,
   the method further comprising:
   receiving the authorization based on at least one of whether the source device is lost or stolen or whether another device has requested reactivation of the digital rights management security information.

3. The method of claim 1, where deactivating the digital rights management security information when the authorization is not received comprises deactivating the digital rights management security information when the authorization is not received after a period of time,
   where the authorization is not received at least one of when the source device is lost or stolen or when another device has requested reactivation of the digital rights management security information.

4. The method of claim 3, where deactivating the digital rights management security information when the authorization is not received comprises deactivating the device.

5. A method performed in a device, the method comprising:
   receiving, via a network, digital rights management security information and content from a source device that previously played at least a portion of the content, the digital rights management security information having been deactivated in the source device;
   reactivating the digital rights management security information; and
   rendering, by the device, the content according to the digital rights management security information.

6. The method of claim 5, where the digital rights management security information corresponds to the content, the method further comprising receiving authorization to reactivate the digital rights management security information,
   where the digital rights management security information includes at least one of time information associated with rendering the content or information identifying a type of device that is allowed to render the content, and
   where the content is rendered when the authorization to reactivate the digital rights management security information is received and based on the at least one of the time information associated with rendering the content or the information identifying the type of device that is allowed to render the content.

7. The method of claim 6, further comprising transmitting confirmation of reactivating the digital rights management security information.

8. The method of claim 5, further comprising decrypting the digital rights management security information,
   where reactivating the digital rights management security information includes:
   reactivating the decrypted digital rights management security information.

9. A device comprising:
   a communication interface to:
   receive, via a network, digital rights management security information and content from a source device that previously played at least a portion of the content, the digital rights management information having been deactivated in the source device; and
   processing logic to:
   reactivate the digital rights management security information, and
   render the content according to the digital rights management security information.

10. The device of claim 9, where the communication interface further receives authorization to reactivate the digital rights management security information,
    where the digital rights management security information includes at least one of time information associated with rendering the content or a count of rendering the content, and
    where the content is rendered when the digital rights management security information has been reactivated and based on the at least one of the time information associated with rendering the content or the count of rendering the content.

11. The device of claim 10, where the communication interface further transmits confirmation of reactivating of the digital rights management security information.

12. The device of claim 9, where the processing logic is further to decrypt the digital rights management security information,
    where the processing logic is to reactivate the digital rights management security information after the digital rights management security information has been decrypted.

13. The device of claim 9, where the device includes a first mobile terminal, and
    where the source device includes a second mobile terminal.

14. A non-transitory computer-readable memory device for storing a plurality of instructions which, when executed by at least one processor, cause the at least one processor to:
    render first content according to first digital rights management security information that corresponds to the first content;
    transmit the first digital rights management security information and the first content;

deactivate the first digital rights management security information when the first digital rights management security information has been transmitted;

receive, via a network, second digital rights management security information and second content from a source that previously played at least a portion of the second content, where the second digital rights management security information is deactivated when the second digital rights management security information has been transmitted by the source;

reactivate the second digital rights management security information; and render the second content according to the second digital rights management security information.

15. The computer-readable memory device of claim 14, further comprising an instruction which, when executed, causes the at least one processor to receive authorization to deactivate the first digital rights management security information.

16. The computer-readable memory device of claim 14, further comprising an instruction which, when executed, causes the at least one processor to transmit confirmation of deactivation of the first digital rights management security information.

17. The computer-readable memory device of claim 14, further comprising an instruction which, when executed, causes the at least one processor to receive authorization to reactivate the second digital rights management security information, where the second digital rights management security information includes at least one of time information associated with rendering the second content or information identifying a type of device that is allowed to render the second content, and where the second content is rendered based on the at least one of the time information associated with rendering the second content or the information identifying the type of device that is allowed to render the second content.

18. The computer-readable memory device of claim 17, further comprising an instruction which, when executed, causes the at least one processor to transmit confirmation of reactivation of the second digital rights management security information.

19. The computer-readable memory device of claim 14, further comprising an instruction which, when executed, causes the at least one processor to repeatedly transmit the first digital rights management security information and the corresponding content.

20. The computer-readable memory device of claim 14, further comprising an instruction which, when executed, causes the at least one processor to encrypt the first digital rights management security information before transmitting the first digital rights management security information.

21. A method comprising:

authorizing a source device to deactivate digital rights management security information corresponding to content, the source device having stored the digital rights management security information and the content, and the source device having played at least a portion of the content; and authorizing a target device to reactivate the digital rights management security information corresponding to the content, the digital rights management security information and the content having been transmitted from the source device, via a network, to the target device.

\* \* \* \* \*